United States Patent [19]

Drummond

[11] 4,122,377
[45] Oct. 24, 1978

[54] VARIABLE SPEED, ALTERNATING CURRENT MOTOR UNIT AND METHODS AND APPARATUS FOR SPEED CONTROL OF SAME

[76] Inventor: Ralph S. Drummond, 2916 Erie Ave., Cincinnati, Ohio 45208

[21] Appl. No.: 824,403

[22] Filed: Aug. 15, 1977

Related U.S. Application Data

[63] Continuation-in-part of Ser. No. 787,642, Apr. 14, 1977, abandoned, which is a continuation of Ser. No. 688,768, May 21, 1976, abandoned.

[51] Int. Cl.² .................. H02P 7/68; H02K 37/00
[52] U.S. Cl. .................... 318/45; 318/71; 310/112
[58] Field of Search ............ 318/45, 48, 71, 77; 310/112

[56] References Cited

U.S. PATENT DOCUMENTS

| | | | |
|---|---|---|---|
| 2,787,747 | 4/1957 | Drummond | 318/45 |
| 3,434,025 | 3/1969 | Parkinson et al. | 318/48 |
| 3,539,887 | 11/1970 | Dennick | 318/8 |
| 3,562,567 | 2/1971 | Carini | 310/112 |
| 3,771,032 | 11/1973 | Hender | 318/45 |

*Primary Examiner*—B. Dobeck
*Attorney, Agent, or Firm*—Wood, Herron & Evans

[57] ABSTRACT

A variable speed, alternating current motor unit which operates continuously in a stepless manner and delivers full torque over a speed range from zero to maximum speed. The unit includes two induction motors which are mounted side-by-side in a housing. Each induction motor is a polyphase, squirrel cage induction motor with a rolled shell stator wound core and an associated rotor core. The stator elements are each equipped with a double shaft extension, and the rotor elements are also each equipped with a double shaft extension. The stator elements are suitably journaled in antifriction bearings which are mounted in the housing. The rotor elements are journaled in the housing in a similar manner. The stator elements are mechanically linked by a gear train so that rotation of one stator element opposes rotation of the other stator element when both of the induction motors are energized. Consequently, the stator elements buck one another and torque is induced in the rotor elements. In one embodiment, the rotor elements are mechanically linked by another gear train to a common output shaft. As a result, when both of the induction motors are energized, additive torque is imparted by the unit to the common output shaft to drive any connected load. In a second embodiment, the rotor elements are mechanically linked, as by means of respective gear trains, to separate output shafts. As a result, when both of the induction motors are energized, equal torque is imparted by the unit to each of the separate output shafts to drive separate connected loads. The side-by-side arrangement provides a compact, lightweight unit. The second embodiment may be advantageously employed in the propulsion system for a vehicle, for example. An eddy current brake to simulate engine braking in an internal combustion engine as well as to provide a no-fade brake system and/or a locked-up differential may be provided in combination with the unit when the unit is utilized in a vehicle. The unit further includes a speed control circuit to control energization of the unit to provide a desired speed over a speed range from zero to maximum speed at full torque. The speed control circuit enables precise and highly responsive speed regulation. In a unit which was constructed in accordance with a preferred embodiment, the unit operated with precise speed regulation of better than plus-or-minus 3 percent.

14 Claims, 15 Drawing Figures

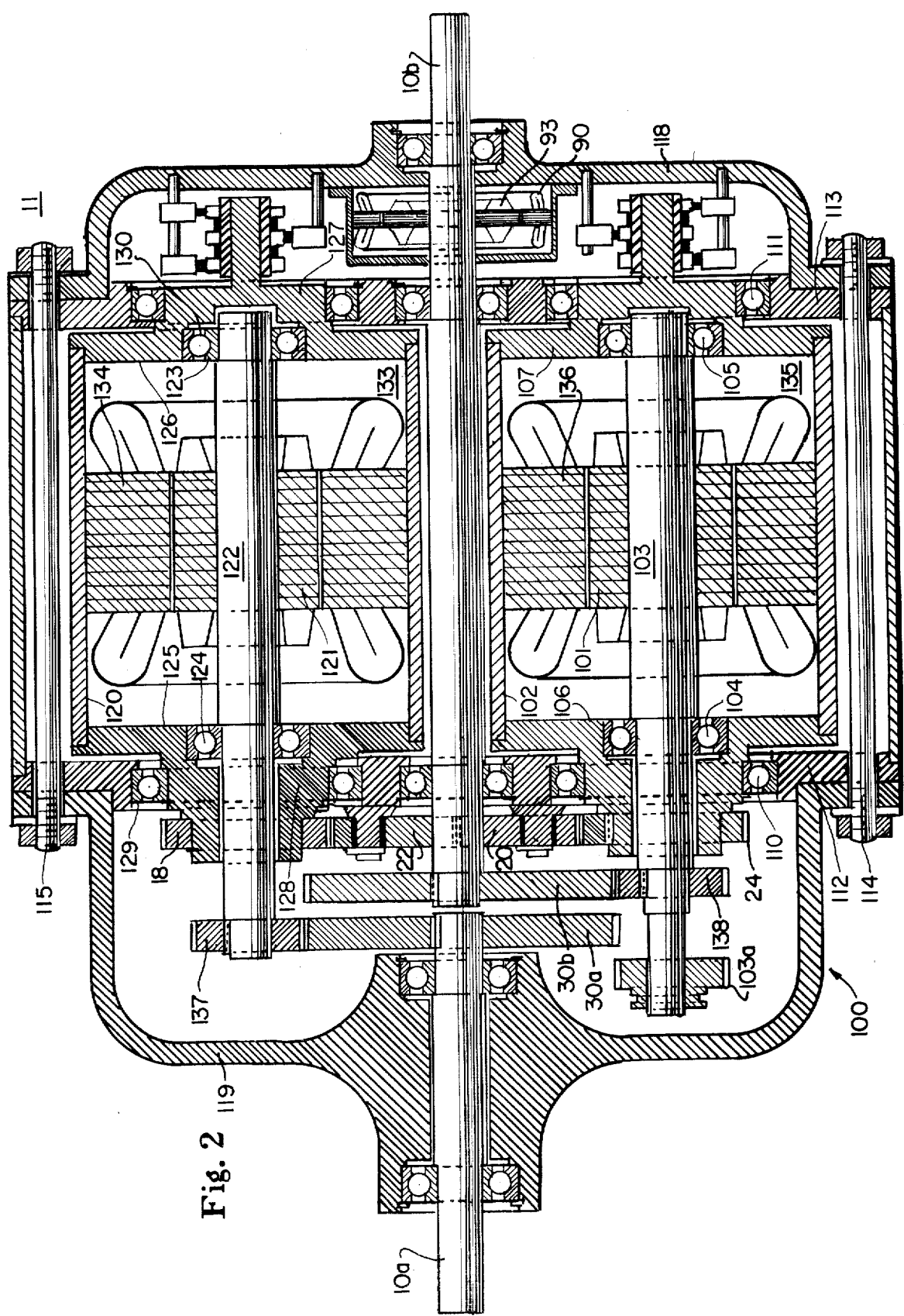

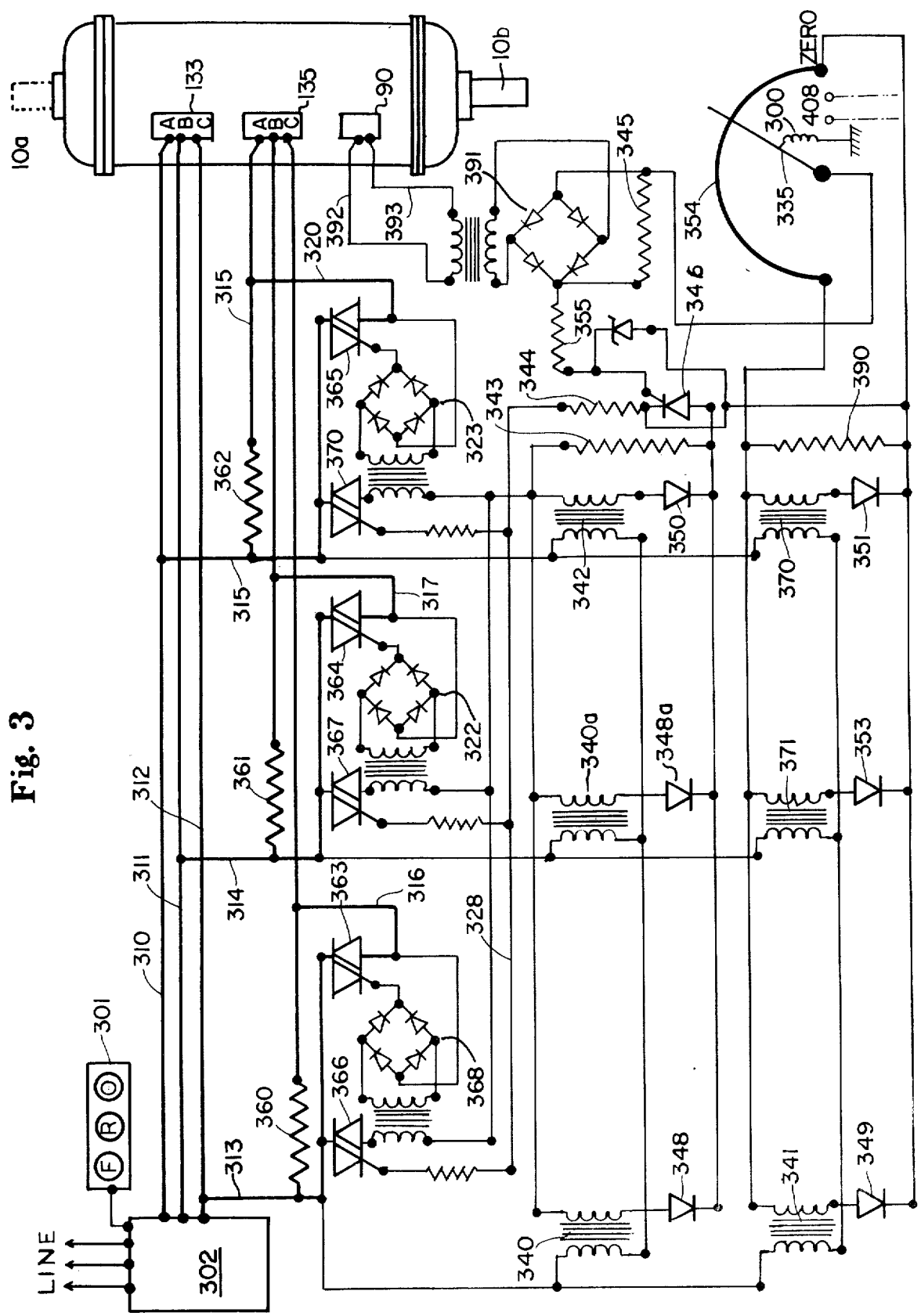

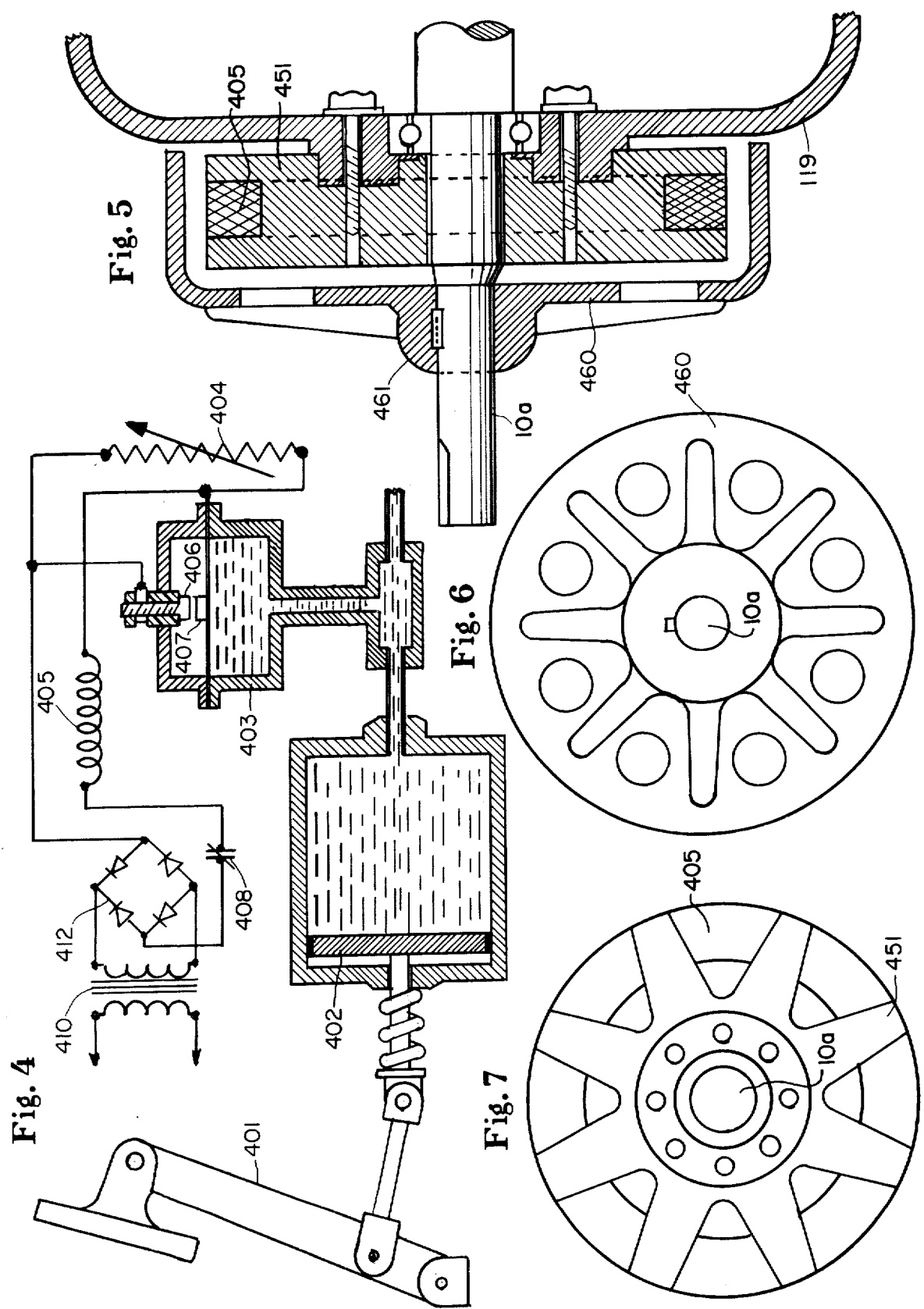

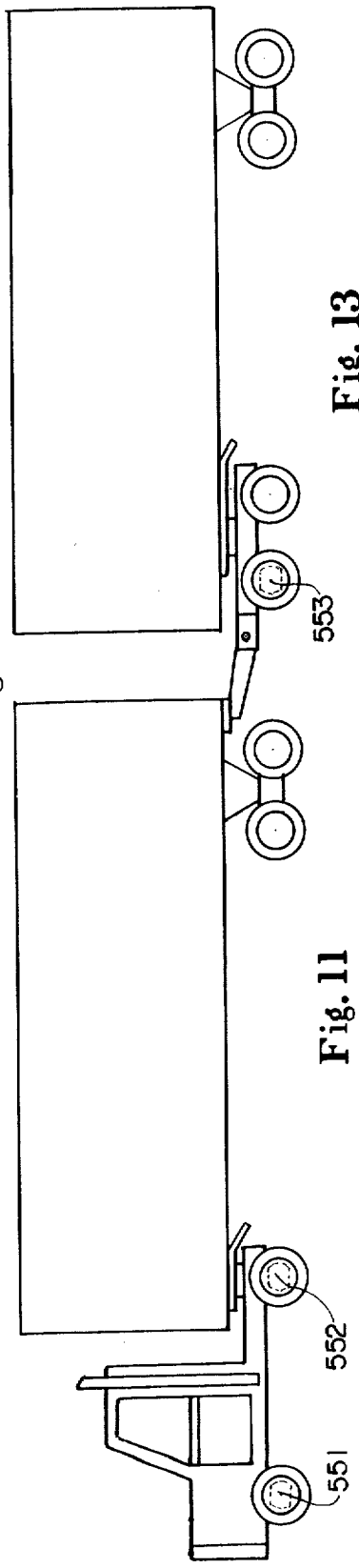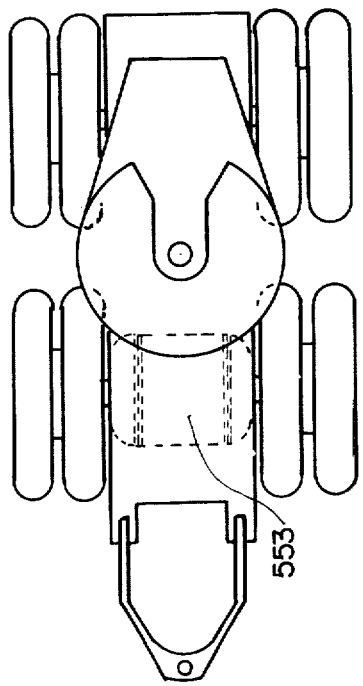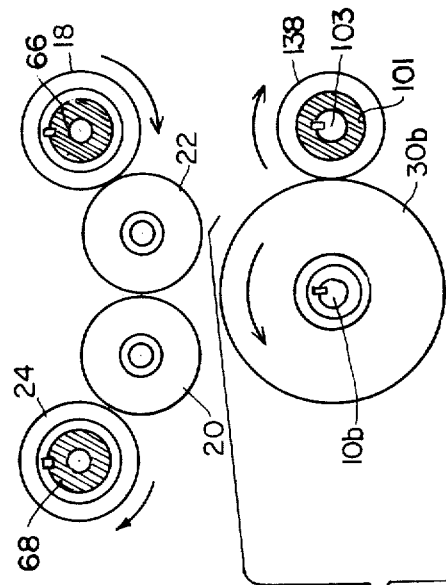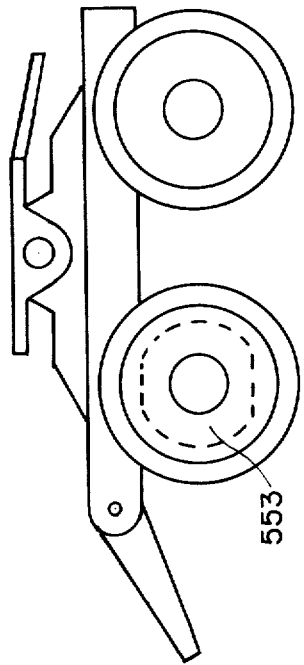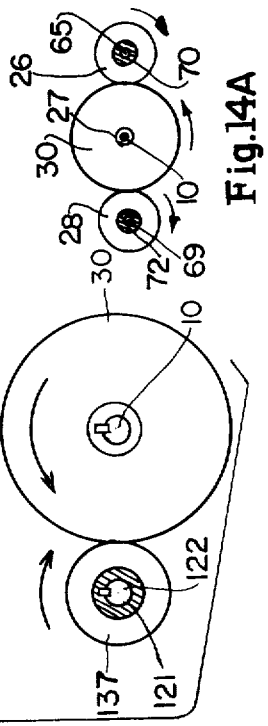

VARIABLE SPEED, ALTERNATING CURRENT MOTOR UNIT AND METHODS AND APPARATUS FOR SPEED CONTROL OF SAME

CROSS-REFERENCE TO RELATED APPLICATIONS

This application is a continuation-in-part of my pending application Ser. No. 787,642 filed Apr. 14, 1977 for "Method of and Means for Varying the Speed of Alternating Current Motors" which in turn is a continuation of my original application Ser. No. 688,768 filed May 21, 1976 for "Method of and Means for Varying the Speed of Alternating Current Motors", both now abandoned.

BACKGROUND OF THE INVENTION

The invention relates to variable speed electrical devices and, more particularly, to methods of and means for infinitely varying the speed of rotation of the drive shaft of an alternating current rotary machine. Specifically, this invention concerns improvement of the structure and operation of a variable speed, alternating current motor unit of the type which is disclosed in my patent for "Method of and Means for Varying the Speed of Alternating Current Motors", U.S. Pat. No. 2,787,747, which issued Apr. 2, 1957.

The variable speed, alternating current motor unit which is disclosed in my U.S. Pat. No. 2,787,747 includes a plural induction motor arrangement wherein two induction motors are arranged end-to-end in a housing. The stator elements are rotatably mounted in the housing and are mechanically linked end-to-end by a gear train so that rotation of one stator element opposes rotation of the other stator element so as to buck one another when both of the induction motors are energized. Consequently, torque is induced in the rotor elements which are either (a) connected to a common output shaft which is rotatably mounted in the housing so as to apply additive torque to drive a load or (b) connected to separate output shafts which are rotatably mounted in the housing so as to apply equal torque to drive separate loads.

The variable speed, alternating current motor unit which is disclosed in my U.S. Pat. No. 2,787,747 further includes a speed control circuit with a saturable core reactor. The voltage difference between a rectified tachometer voltage generated by the unit and a reference voltage established by a speed setting potentiometer controls the magnetic flux density in the core of the saturable core reactor to regulate the amount of power to one of the induction motors. This controls the extent to which the stator elements buck one another and, hence, regulates the speed of the unit.

The variable speed, alternating current motor unit which is disclosed in my U.S. Pat. No. 2,787,747 has proved quite satisfactory and has performed capably in many industrial and other types of applications. Nevertheless, there are some applications in which the structure and operation of the unit have made use of the unit impractical or infeasible.

The primary limitation is the size of the unit which is disclosed in my U.S. Pat. No. 2,787,747. Specifically, since the induction motors are arranged end-to-end, the unit is of considerable length. The length is further increased by the configuration of axially aligned bevel and idler gears in a separate housing compartment to mechanically link the stator elements so as to buck one another. Another limitation is the weight of the unit. That is, the mechanically linked induction motors in the end-to-end arrangement are contained in a housing with a plurality of compartments which are separated by heavy wall plates that support antifriction bearings. The need for additional compartments which are also separated by heavy wall plates that support antifrictional bearings are indicated if speed reduction gears are included between a rotor element and an associated output shaft. Consequently, the amount of material which comprises the housing for the mechanically linked induction motors in the end-to-end arrangement renders the weight of the unit substantial, even if high strength, lightweight materials are utilized in construction.

As a result of the considerable length and weight of the unit which is disclosed in my U.S. Pat. No. 2,787,747, employment as a drive system is limited to applications with relatively heavy machine equipment, such as milling or printing machines, large vehicles, such as buses, etc. Employment as a drive system in light machine equipment, such as drill presses, small vehicles, such as economy-size cars, etc. has not been possible due to the considerable length and weight of the unit.

Furthermore, the speed control circuit which is disclosed in my U.S. Pat. No. 2,787,747 has a low response primarily due to the characteristics of the saturable core reactor. The magnetic flux density in the saturable core reactor changes relatively slowly which introduces a speed control lag. The resultant speed control lag detracts from the precision with which the speed of the unit is regulated which in turn reflects in the degree of smoothness of operation of the unit that is achievable as the unit drives a load. There is at the present time a need for precise speed control of electrical motors in more sophisticated industrial equipment and, also, in the application of electrical motors in vehicle propulsion.

The primary object of my invention is to provide a variable speed, alternating current motor unit which produces a high torque but is designed and constructed so as to produce a significant reduction in both the size and weight of the unit.

Another object of my invention is to improve the speed control circuit for a variable speed, alternating current motor unit by employing solid state components that not only reduce the size and weight of the circuit but also permit the use of modular construction to reduce manufacturing and maintenance costs.

Another object of my invention is to provide for the utilization of manual control devices and mechanical, photo-electric, tachometer or similar speed monitoring devices where the speed monitoring signal is less than two watts.

Another object of my invention is to provide a variable speed, alternating current motor unit so that the energy required to control speed instead of being dissipated in heat loss is reflexed back into the unit resulting in higher efficiency at all speed levels.

Another object of my invention is to provide a variable speed, alternating current motor unit that may be employed in a vehicle propulsion system which is accomplished by placing the vehicle's propulsion wheels on shaft extensions.

A further object of my invention is to provide a variable speed, alternating current motor unit which acts as a differential due to its characteristics to slip a few rotations without harm to the unit.

Another object of my invention is to provide a variable speed, alternating current motor unit with windings adapted for use on high frequency alternating currents with the high frequency power to be generated in a high frequency alternator driven by a direct-connected gas turbine to produce a nonpolluting vehicle propulsion system.

A further object of my invention is to provide for a decelerating force to be applied to a vehicle in motion when the throttle is closed, thus overcoming the lack of compression decelerating force in a vehicle propelled by a turbo-electric system thereby preventing the vehicle from free-wheeling.

A further object of my invention is to provide a speed control that maintains a constant desired speed.

Another object of my invention is to provide a brake system which is not subject to glazing or burning of the braking surfaces, thereby avoiding fading of the braking effort.

Another object of my invention is to provide for braking of a vehicle by employment of eddy currents created by the electrical energy supplied by a turbo-electric system which propels the vehicle.

Another object of my invention is to provide a locked-up differential.

Another object of my invention is to provide a circuit for a speed control which is applicable to either industrial or vehicular use in that the modular construction simplifies construction and maintenance.

SUMMARY OF THE INVENTION

My invention provides a compact, lightweight variable speed, alternating current motor unit which operates to provide full torque from zero to maximum speed. The unit operates continuously in a stepless manner so as to provide a highly responsive, smooth drive throughout the entire speed range.

The unit includes two induction motors which are mounted side-by-side in a housing. Each induction motor has a stator element and a rotor element. The stator elements and rotor elements are suitably journaled so that both of the stator elements and both of the rotor elements are rotatable. The stator elements are mechanically linked by a gear train so that rotation of one stator element opposes rotation of the other stator element when both of the induction motors are energized. As a result, the stator elements buck one another and induce torque in the rotor elements.

The side-by-side configuration makes possible a significant reduction in the size and weight of the unit. Additionally, each induction motor is a polyphase, squirrel cage, rolled shell type so as to minimize the weight of the unit.

In one embodiment, the rotor elements are mechanically linked by another gear train to a common output shaft. As a result, when both of the induction motors are energized, additive torque is imparted by the unit to the common output shaft to drive any connected load.

In a second embodiment, the rotor elements are mechanically linked, as by means of respective gear trains, to separate output shafts. As a result, when both of the induction motors are energized, equal torque is imparted by the unit to each of the separate output shafts to drive separate connected loads.

The first embodiment may be advantageously employed in a machine tool, for example, due to compact size and low weight. The second embodiment may be advantageously employed in the propulsion system for a vehicle, for example, an automobile, due to compact size and low weight. An eddy current brake, which simulates engine braking in an internal combustion engine as well as provides a no-fade brake system and/or a locked-up differential may be provided in combination with the unit when the unit is utilized in a vehicle.

The unit further includes a speed control circuit. A push button switch connects the unit to an alternating current source. A first of the induction motors is continuously energized by the alternating current source. The second induction motor is selectively energized by the alternating current source under the control of a triac switch circuit. When the triac switch circuit is triggered, the second induction motor is energized so that the stator element of the second induction motor bucks the stator element of the first induction motor and torque is induced in the rotor elements.

The triac switch circuit is triggered by a trigger circuit. The trigger circuit is under the control of a voltage comparison circuit which includes a speed selector and a motor speed transducer. When the speed selector is initially positioned by an operator to a desired speed, the speed selector voltage exceeds the motor speed transducer voltage until the unit reaches the desired speed. Consequently, the triac switch circuit is triggered to energize the second induction motor. As a result, the stator element of the second induction motor bucks the stator element of the first induction motor and torque is induced in the rotor elements.

As the rotor elements rotate, the motor speed transducer generates a voltage which is proportional to the speed of the unit. When the speed of the unit reaches the desired speed, the motor speed transducer voltage equals the speed selector voltage so that the triac switch circuit is not triggered. This de-energizes the second induction motor, and, consequently, the stator element of the second induction motor ceases bucking the stator element of the first induction motor so that no torque is imparted to the rotor elements. When the load on the unit causes the speed of the unit to fall below the desired speed, the second induction motor is again energized and later de-energized as above in a repetitive sequence to maintain the speed of the unit at the desired speed.

Preferably, solid state components are utilized in the construction of the speed control circuit to provide maintenance-free operation, long life and fast switching times as compared to noisy operation, short life and slow switching times of electromechanical switches. The "turn on" and "turn off" operation is completed in a matter of a few microseconds so that precise speed regulation is achievable. In a unit which was constructed in accordance with a preferred embodiment, precise speed regulation of better than plus-or-minus three percent was attained.

BRIEF DESCRIPTION OF THE DRAWING

My invention is illustrated in the accompanying drawing in which:

FIG. 2 is a sectional view of another embodiment of a variable speed electrical device in accordance with my invention;

FIG. 3 is a schematic diagram of a speed control circuit for the apparatus shown in FIGS. 1 and 2;

FIG. 4 is a sectional view of a brake system and including a schematic diagram for a no-fade brake system in accordance with my invention;

FIG. 5 is a detail view of a portion of the no-fade brake system in FIG. 4;

FIG. 6 is a plan view of a brake drum shown in FIG. 5;

FIG. 7 is a plan view of a spider shown in FIG. 5;

FIG. 10 is a side view of another vehicle in which the variable speed electrical devices of my invention may be utilized in the propulsion system;

FIG. 11 is a view of a preferred placement of the variable speed electrical device in the booster dolly in the vehicle in FIG. 10;

FIG. 12 is a side view of the booster dolly shown in FIG. 11;

FIG. 13 is a detail view of gearing which interconnects the stator elements in the variable speed electrical devices in FIGS. 1 and 2;

FIG. 14A is a detail view of gearing which interconnects the rotor elements to the common output shaft in the variable speed electrical device in FIG. 1; and FIG. 14B is a detail view of gearing which interconnects the rotor elements to the separate output shafts in the variable speed electrical device in FIG. 2.

DETAILED DESCRIPTION

Figure 1:
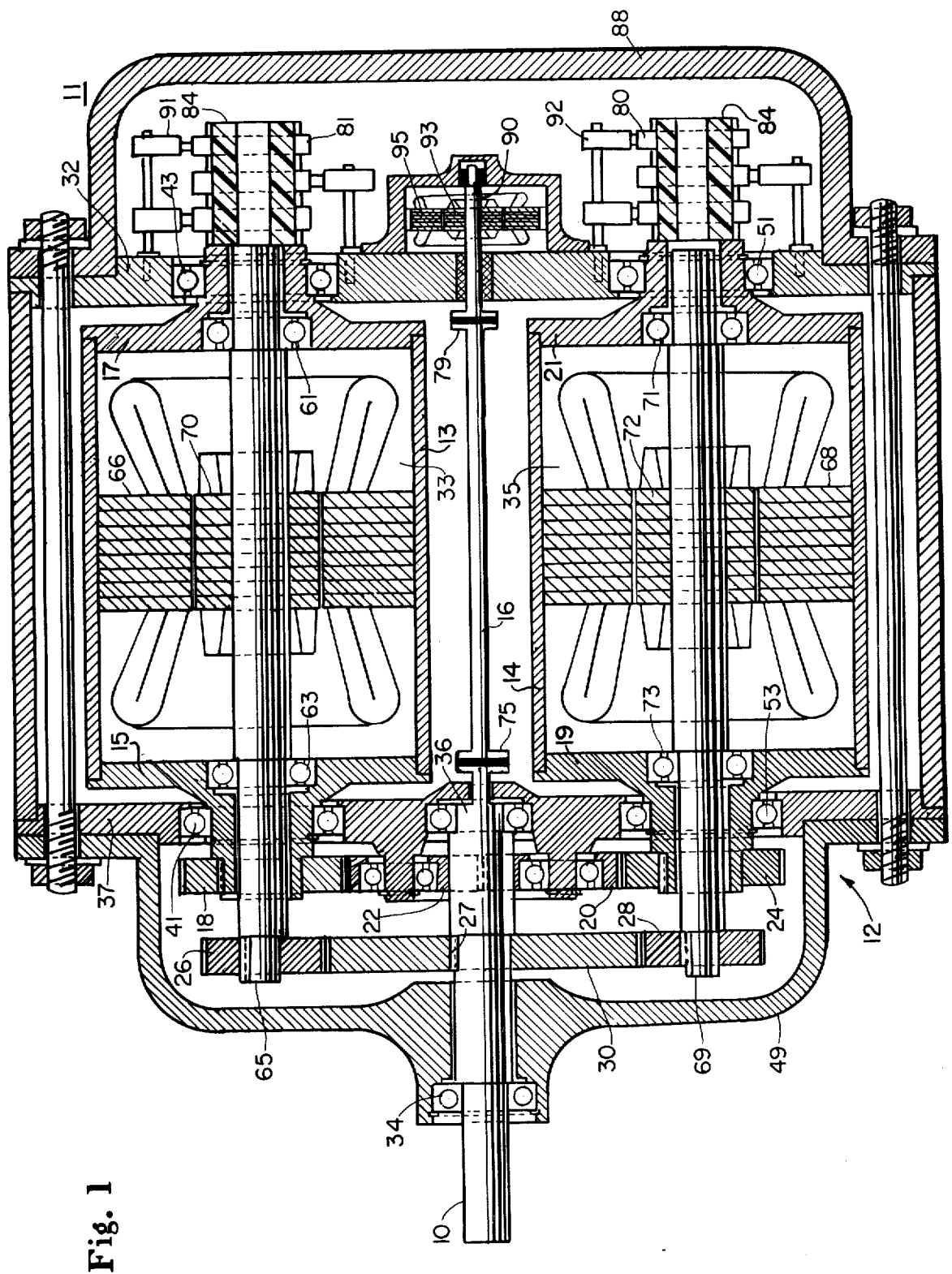
FIG. 1 is a sectional view of one embodiment of a variable speed electrical device in accordance with my invention.

With reference to FIG. 1, a first embodiment of the variable speed, alternating current motor unit of my invention will now be described. The variable speed, alternating current motor unit, which is designated generally by the numeral 11, includes two induction motors 33 and 35 which are polyphase, wound squirrel cage induction motors of conventional construction.

The stator winding 66 of the induction motor 33 is mounted in a motor casing 13. Similarly, the stator winding 68 of the induction motor 35 is mounted in a motor casing 14. The end portions 15 and 17 of the motor casing 13 are configured to form a double shaft extension and are journaled in the bearings 41 and 43 which are supported by the bearing brackets 37 and 32 which form a part of a housing 12. The end portions 19 and 21 of the motor casing 14 are similarly configured to form a double shaft extension and are journaled in the bearings 53 and 51 which are supported by the bearing brackets 37 and 32. As can be seen in FIG. 1, the stator element 66, 13, 15, 17 and the stator element 68, 14, 19, 21 are rotatable in the housing 12.

The rotor winding 70 of the induction motor 33 is mounted on a rotor shaft 65 while the rotor winding 72 of the induction motor 35 is mounted on a rotor shaft 69. The rotor shaft 65 is journaled in the bearings 61 and 63 which may be supported by the end portions 17 and 15 as shown in FIG. 1. The rotor shaft 69 is journaled in the bearings 71 and 73 which may be supported by the end portions 21 and 19. As can be seen in FIG. 1, the rotor element 70, 65 and the rotor element 72, 69 are rotatable.

The stator element 66, 13, 15, 17 and the stator element 68, 14, 19, 21 which are rotatably supported in the housing 12 are mechanically linked by a gear train which includes the gears 18, 20, 22 and 24. The gear 18 may be mounted on one end portion 15 of the motor casing 13 while the gear 24 may be mounted on one end portion 19 of the motor casing 14. Each of the gears 20 and 22 may be rotatably supported by the bearing bracket 37 so that the teeth of the gears 20 and 22 mesh with each other and so that the teeth of the gear 20 also mesh with the teeth of the gear 24 while the teeth of the gear 22 also mesh with the teeth of the gear 18. Consequently, if the rotation of the magnetic field in the stator winding 66 of the induction motor 33 and the rotation of the magnetic field in the stator winding 68 of the induction motor 35 are assumed to be in the same direction, the gear train 18, 20, 22, 24 causes the rotation of the stator element 66, 13, 15, 17 to oppose the rotation of the stator element 68, 14, 19, 21 when both of the induction motors 33 and 35 are energized as shown in FIG. 13. Stated differently, when both of the induction motors 33 and 35 are energized, the stator element 66, 13, 15, 17 bucks the stator element 68, 14, 19, 21 so as to impart torque to the rotor elements 70, 65 and 72, 69.

In the embodiment which is shown in FIG. 1, a gear 26 is mounted on one end of the rotor shaft 65. Similarly, a gear 28 is mounted on one end of the rotor shaft 69. A common output shaft 10 is journaled in the bearings 34 and 36 which may be supported by an end bell 49 of the housing 12 and the bearing bracket 37, respectively. A gear 30 is mounted on the common output shaft 10 by any suitable means, such as by a key 27, so that the teeth of the gear 30 mesh with the teeth of the gears 26 and 28. Consequently, when both of the induction motors 33 and 35 are energized so that the magnetic field in the stator winding 66 and the magnetic field in the stator winding 68 rotate in the same direction, the torques which are produced by the induction motors 33 and 35 cause the rotor element 70, 65 and the rotor element 72, 69 to rotate in the same direction. As shown by the arrangement of the gear train 26, 28, 30 in FIG. 14A, the resultant torque which drives the common output shaft 10 is the additive torque of the induction motors 33 and 35.

An alternating current source is connected to the stator winding 66 of the induction motor 33 through the brushes 91 and the slip rings 81 and also selectively connected to the stator winding 68 of the induction motor 35 through the brushes 92 and the slip rings 80. In the slip rings 80 and 81, insulating sleeves 84 are preferably provided as shown in FIG. 1. An end bell 88 of the housing 12 covers the slip rings 80 an 81 and the brushes 91 and 92.

With reference to FIG. 1, an extension 16 of the common output shaft 10 is connected to and drives a tachometer 90 which serves as a motor speed transducer. Preferably, a flexible coupling 75 interconnects the extension 16 with the common output shaft 10, and a flexible coupling 79 interconnects the extension 16 with the rotor shaft of the tachometer 90. As the common output shaft 10 rotates, the tachometer 90 generates a voltage which is proportional to the motor speed. The tachometer 90 is shown mounted to the bearing bracket 32 and is covered by the end bell 88 of the housing 12.

With reference now to FIG. 2, a second embodiment of the variable speed, alternating current motor unit of my invention will now be described. The variable speed, alternating current motor unit in FIG. 2 includes induction motors 133 and 135. The stator winding 134 of the induction motor 133 is mounted in a motor casing 120 while the stator winding 136 of the induction motor 135 is mounted in a motor casing 102. The end portions 125 and 126 of the motor casing 120 are configured to form a double shaft extension and are journaled in the bearings 129 and 130 which are supported by the bearing brackets 112 and 113 which form part of a housing 100. Similarly, the end portions 106 and 107 of the motor casing 102 are configured to form a double shaft extension and are journaled in the bearings 110 and 111 which are supported by the bearing brackets 112 and 113.

The rotor winding 101 of the induction motor 135 is mounted on a rotor shaft 103. The rotor shaft 103 is journaled in the bearings 104 an 105 which are supported by the end portions 106 and 107. Similarly, the rotor winding 121 of the induction motor 133 is mounted on a rotor shaft 122. The rotor shaft 122 is journaled in the bearings 124 and 123 which are supported by the end portions 125 and 126.

A gear train which includes the gears 18, 20, 22 and 24 mechanically links the stator element 134, 120, 125, 126 and the stator element 136, 102, 106, 107. If the rotation of the magnetic field in the stator winding 134 of the induction motor 133 and the rotation of the magnetic field in the stator winding 136 of the induction motor 135 are assumed to be in the same direction, the gear train 18, 20, 22, 24 causes the stator element 136, 102, 106, 107, to buck the stator element 134, 120, 125, 126 when both of the induction motors 133 and 135 are energized so as to impart torque to the rotor elements 121, 122 and 101, 103.

In the embodiment which is shown in FIG. 2, each rotor shaft 122 or 103 is connected to a separate output shaft. The rotor shaft 122 is connected to an output shaft 10a. As shown in FIG. 2, the output shaft 10a may be journaled in bearings which are supported by an end bell 119. A gear 137 is preferably mounted on the rotor shaft 122 such that the teeth of the gear 137 mesh with the teeth of a gear 30a which is mounted on the output shaft 10a.

In a similar manner, the rotar shaft 103 is connected to an output shaft 10b. As shown in FIG. 2, the output shaft 10b may be journaled in bearings which are supported by the bearing brackets 112 and 113 and an end bell 118 of the housing 100. A gear 138 is preferably mounted on the rotor shaft 103 such that the teeth of the gear 138 mesh with the teeth of a gear 30b which is mounted on the output shaft 10b.

When both of the induction motors 133 and 135 are energized, torque which is produced by the induction motor 133 is transferred by the gear train 137, 30a to the output shaft 10a while torque which is produced by the induction motor 135 is transferred by the gear train 138, 30b to the output shaft 10b to drive separate connected loads. When the magnetic field in the stator winding 134 and the magnetic field in the stator winding 136 rotate in the same direction, the torques which are produced by the induction motors 133 and 135 cause the rotor element 121, 122 and the rotor element 101, 103 to rotate in the same direction. As shown by the arrangement of the gear train 30a, 137 and by the arrangement of the gear train 30b, 138 in FIG. 14B, the output shaft 10a and the output shaft 10b are driven in a like direction but in a direction which is opposite that of the rotation of the stator and rotor elements.

A locked-up differential may be provided to synchronize the rotation of the output shafts 10a and 10b in the event that the torque which is required to drive either output shaft becomes substantially less than the torque which is required to drive the other output shaft. The locked-up differential includes a gear 103a which is slidable on an extension of the rotor shaft 103 to mechanically interconnect the output shafts 10a and 10b. The gear 103a may be splined on the extension of the rotor shaft 103 so that when the gear 103a is slid into engagement with the gear 30a by means of a device (not shown), which may be electrically, mechanically or manually actuated, a locked-up differential between the output shafts 10a and 10b results through the gear train 103a, 30a, 30b, 137, 138.

With reference to FIG. 2, the rotor winding 93 of a tachometer 90 may be mounted on the output shaft 10b. As the output shaft 10b rotates, the tachometer 90 generates a voltage which provides a measure of motor speed.

FIG. 3 illustrates a speed control circuit for the variable speed, alternating current motor unit of my invention. The speed control circuit will be described as applied in a propulsion system for a vehicle wherein the embodiment shown in FIG. 2 is preferably employed. For the purpose of this description, induction motors 133 and 135 will be considered to be three-phase.

Selection of direction of rotation of the output shafts 10a and 10b is accomplished by depression of one of the push bottons 301 which control a reversing contactor 302. The contactor 302 interconnects an alternating current source LINE to a set of conductors.

When the forward (F) or reverse (R) push botton 301 is depressed so as to close the contactor 302, a conductor 310 connects the LINE voltage to phase A of the induction motor 133. Similarly, a conductor 311 connects the LINE voltage to phase B of the induction motor 133, and a conductor 312 connects the LINE voltage to phase C of the induction motor 133. Also, a conductor 313 and a series resistor 360 connect the LINE voltage to phase C of the induction motor 135. Similarly, a conductor 314 and a series resistor 361 connect the LINE voltage to phase B of the induction motor 135, and a conductor 315 and a series resistor 362 connect the LINE voltage to phase A of the induction motor 135.

A triac switch circuit which includes a triac 363, a conductor 316 and the conductor 313 shunts the resistor 360. The triac switch circuit which also includes a triac 364, a conductor 317 and the conductor 314 shunts the resistor 361. In a similar manner, the triac switch circuit which further includes a triac 365, a conductor 320 and the conductor 315 shunts the resistor 362.

When the triacs 363, 364 and 365 are triggered, the resistors 360, 361 and 362 are short-circuited so that full LINE voltage is applied to the induction motor 135. Consequently, the induction motor 135 bucks the induction motor 133, and torque is imparted to the output shafts 10a and 10b.

The resistors 360, 361 and 362 are provided in the preferred form of the speed control circuit as illustrated in FIG. 3 so that the induction motor 135 is excited by a small current at all times. This enhances the response of the induction motor 135 upon triggering of the triac switch circuit and limits the inrush current to the induction motor 135. The result is smoother operation of the variable speed, alternating current motor unit of my invention. Nevertheless, the resistors 360, 361 and 362 may represent infinite resistance, that is, by open-circuited, and such a modified speed control circuit is contemplated by my invention.

A trigger circuit which includes a triac 366 and a transformer and full-wave rectifier 368 supplies the trigger voltage for the triac 363. The trigger circuit which also includes a triac 367 and a transformer and full-wave rectifier 322 supplies the trigger voltage for the triac 364. The trigger circuit which further includes a triac 370 and a transformer and full-wave rectifier 323 supplies the trigger voltage for the triac 365.

A tranformer 340 and an associated diode 348, a transformer 340a and an associated diode 348a and a transformer 342 and an associated diode 350 are connected in parallel across a load resistor 343. The voltage across the load resistor 343 provides the trigger voltage for the trigger circuit when a silicon-controlled rectifier (SCR) 346 fires to supply the trigger voltage via a resistor 344 and a conductor 328 under the control of a voltage comparison circuit.

A transformer 341 and an associated diode 349, a transformer 370a and an associated diode 351 and a transformer 371 and an associated diode 353 are connected in parallel across a load resistor 390. The load resistor 390 is shunted by a speed selector 354.

The speed selector 354 may be a potentiometer with a positionable wiper 335 as shown in FIG. 3. The speed selector voltage which is determined by the position of the wiper 335 represents a calibration for a desired speed.

With reference to FIG. 3, the wiper 335 may be mechanically biased, for example, by a spring 300 to a zero position wherein the speed selector voltage is zero. The wiper 335 may also be operative to close the contacts 408 when the wiper 335 is in the zero position for a purpose which will be explained hereinafter. The wiper 335 may be in the form of a foot-operated throttle.

The motor speed transducer, or tachometer, 90 generates a voltage upon rotation of one of the output shafts, for example, the output shaft 10b as shown in FIG. 2. The tachometer voltage is connected across a transformer and full-wave rectifier 391 by the conductors 392 and 393. The transformed and rectified tachometer voltage is opposite in polarity to the voltage which is set by means of the speed selector 354.

The transformer and rectified tachometer voltage and the speed selector voltage are summed across a resistor 345 which is included in the voltage comparison circuit. The resultant voltage is connected through a resistor 355 to the gate of the SCR 346.

The speed control mechanism functions in the following manner. The LINE may be, for example, a turbo-electric system in a vehicle. When the vehicle is stationary and the gas turbine is running at a constant speed and driving an alternator which develops the LINE voltage, an operator advances the wiper 335 of the speed selector 354 to a desired speed setting, thereby gating the SCR 346 into conduction and supplying trigger voltage to the triacs 366, 367 and 370 which in response energize the transformers 368, 322 and 323. The rectified secondary voltage of these transformers then triggers triacs 363, 364 and 365, thereby short-circuiting the resistors 360, 361 and 362.

When the resistors 360, 361 and 362 are short-circuited, full LINE voltage is supplied to the induction motor 135. Consequently, the induction motor 135 bucks the induction motor 133 so that torque is imparted to the output shafts 10a and 10b.

With rotation of the output shafts 10a and 10b, the vehicle is propelled in the direction which is selected by the push botton 301. With the vehicle starting to accelerate and move, the tachometer 90 begins to generate a voltage proportional to the motor speed. When the transformed and rectified tachometer voltage equals the speed selector voltage, being of opposite polarity, the transformed and rectified tachometer voltage cancels the gating voltage for the SCR 346 which in turn cuts off the trigger voltage for the triacs 366, 367 and 370.

When this cut off occurs, the energization of the transformers 368, 322 and 323 ceases, thereby cutting off the trigger voltage for the triacs 363, 364 and 365. This removes the short circuit across the resistors 360, 361 and 362 to reduce the bucking effect of the induction motor 135 over the induction motor 133 which then allows the stator elements to accelerate while the rotor elements decelerate at the same rate of speed.

This action also causes the tachometer 90 to slow down, thereby producing a drop in the tachometer voltage. When the transformed and rectified tachometer voltage falls below the speed selector voltage so that the transformed and rectified tachometer voltage no longer cancels the speed selector voltage, the SCR 346 refires. This results in repetition of the above-described cycle of operation of the speed control circuit.

In FIG. 4, I illustrate the arrangement of the components of a no-fade brake system for employment in a vehicle which includes the variable speed, alternating current motor unit in FIGS. 2 and 3. A foot pedal 401 operates the plunger of a master cylinder 402 of the vehicle's conventional hydraulic brake system. A pressure switch 403 is fastened to a "T" fitting which communicates with the hydraulic brake system. The pressure switch 403 is adjusted so that when an excessive pressure is applied by the brake pedal 401 the pressure switch 403 forces the contacts 407 and 406 to close.

The closure of the contacts 407 and 406 short-circuits a ballast resistor 404, thereby applying full voltage of a transformer 410 and full-wave rectifier 412 to a brake coil 405. This action then sets up increased eddy currents in a brake drum 460 to cause a braking effect to be applied to the output shaft 10a as shown in more detail in FIGS. 5–7.

With reference to FIGS. 5–7, a brake drum 460 is mounted on the output shaft 10a as by means of a key 461. A magnetic spider 451 and the brake coil 405 are mounted on the end bell 119 of the embodiment in FIG. 2. A similar structure is provided for the output shaft 10b of the embodiment in FIG. 2. The eddy current brake absorbs the initial braking action so that no fading occurs in the braking effort.

As shown in FIG. 3, when the speed selector 354 is advanced to a desired speed setting, the contacts 408 are opened, thereby de-energizing the brake coil 405 in FIG. 4. When the speed selector 354 is released, however, the wiper 335 is spring-biased so that the contacts 408 are closed, but the contacts 406 and 407 remain open unless the foot pedal 401 is depressed. In this case, the brake coil 405 is sufficiently energized to provide for a decelerating force to simulate engine braking in an internal combustion engine. The decelerating force preferably can be adjusted by means of varying the resistance of the ballast resistor 404.

Figure 8:
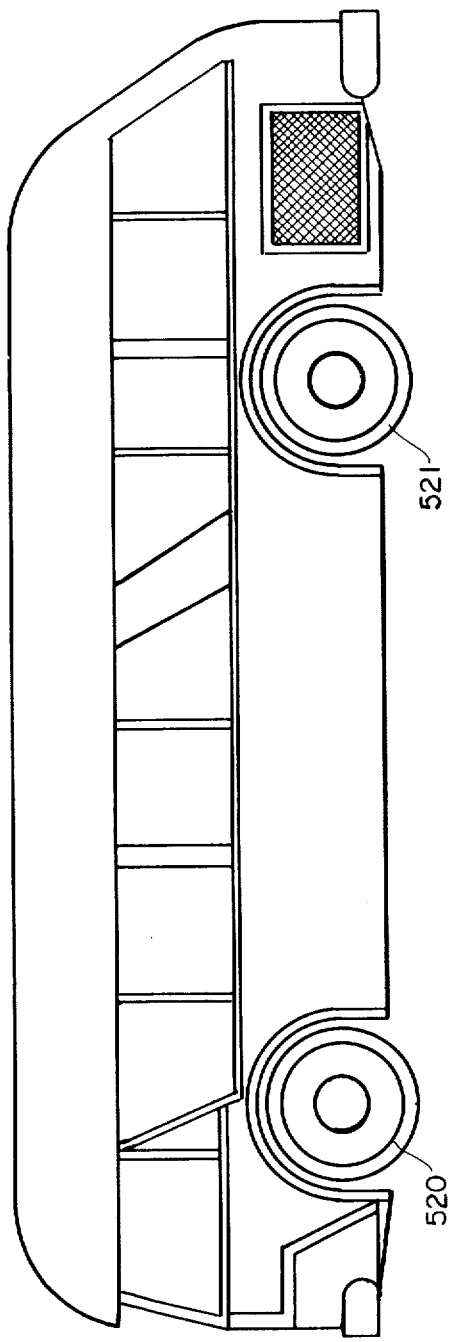
FIG. 8 is a view in side elevation of a vehicle in which one or more of the variable speed electrical devices of my invention may be utilized in the propulsion system.
Figure 9:
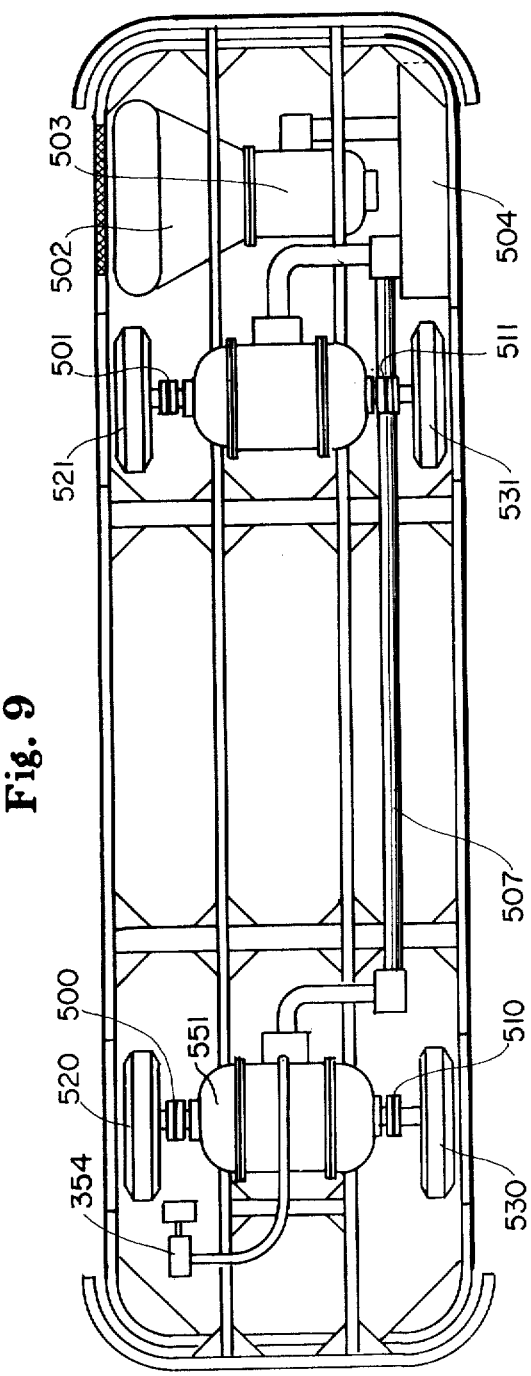
FIG. 9 is a view of a preferred placement of the variable speed electrical devices in the vehicle in FIG. 8.

In FIGS. 8 and 9, I illustrate placement of the variable speed, alternating current motor units of my invention in a vehicle's propulsion system. The units are applied as a four-wheel drive in which mechanical differential gear boxes are eliminated. These units can be operated in parallel or independently of each other. One unit is coupled through the couplings 500 and 510 to the vehicle's drive wheels 520 and 530. A similar arrangement is shown at the couplings 501 and 511, the drive wheels 521 and 531 being coupled to another unit. The units are supplied with voltage through a conduit 507 from a control cabinet 504. Voltage is generated by a three-phase alternator 503, which in turn is driven by a gas turbine 502. The vehicle's speed is selected by a foot-operated speed selector 354 in a manner similar to the foot throttle of a conventional vehicle. The four-wheel drive of my invention provides a more dependable drive than the usual two-wheel drive and results in easier handling of the vehicle and affords greater traction.

In FIG. 10, I illustrate a further application of the variable speed, alternating current motor unit of my invention. A tractor is equipped with a four-wheel drive which includes units 551 and 552 with additional driving power being supplied by another unit 553 in a booster dolly. The booster dolly is illustrated in FIGS. 11 and 12.

In a preferred construction of the variable speed, alternating current motor units in accordance with the embodiments in FIGS. 1 and 2, rolled shell induction motors, such as described in Bulletin 107 of the Louis Allis Company, are utilized. Use of this type of motor enables a more than fifty percent reduction in weight. The compact configuration of the variable speed, alternating current motor unit in the embodiment in FIG. 2 with lightweight construction by means of rolled shell induction motors has particular advantage in the propulsion system of a vehicle since every cubic foot of space and every pound of weight are as important in the auto industry as in aviation. Such a variable speed, alternating current motor unit is more efficient, smaller and lighter than a conventional internal combustion engine of comparable horsepower.

It should also be noted that the variable speed, alternating current motor unit may be energized by a turbine and alternator as shown in FIG. 9. The turbine can be driven by combustion of any type of fuel, including fuels which are more plentiful and cleaner-burning than gasoline. Consequently, the variable speed, alternating current motor unit provides an alternative to the conventional internal combustion engine for propelling vehicles with concomitant conservation of gasoline, reduction of pollution, etc.

Reference has been made to three-phase induction motors. The induction motors, however, may be two-phase where so desired.

It should be understood that various modifications may be made in the embodiments which are illustrated without departing from the spirit of the invention. The invention is not limited to the specific details as shown but is defined as set forth in the appended claims.

Having thus described my invention which I claim as new and useful and desire to secure by Letters Patent, I claim:

1. In a variable speed, alternating current motor unit including two induction motors rotatably mounted in a housing so that the stator elements of the induction motors buck one another to induce torque in the rotor elements of the induction motors when both of the induction motors are energized and further including a speed control circuit for energizing the induction motors, the improvement comprising:

structure defining a housing including support means for rotatably mounting the induction motors in side-by-side relation, a first gear train interconnecting the stator elements so that the stator elements of the induction motors buck one another to induce torque in the rotor elements when both of the induction motors are energized, a common output shaft, and a second gear train interconnecting the rotor elements to the common output shaft, whereby when both of the induction motors are energized additive torque is imparted to the common output shafts.

2. The variable speed, alternating current motor unit in claim 1 wherein the induction motors are rolled shell induction motors.

3. In a variable speed, alternating current motor unit including two induction motors rotatably mounted in a housing so that the stator elements of the induction motors buck one another to induce torque in the rotor elements of the induction motors when both of the induction motors are energized and further including a speed control circuit for energizing the induction motors, the improvement comprising:

structure defining a housing including support means for rotatably mounting the induction motors in side-by-side relation, a gear train interconnecting the stator elements so that the stator elements of the induction motors buck one another to induce torque in the rotor elements when both of the induction motors are energized, a first output shaft, a second output shaft, a first means for interconnecting the rotor element of one of the induction motors to the first output shaft, and a second means for interconnecting the rotor element of the other induction motor to the second output shaft, whereby when both of the induction motors are energized equal torque is imparted to each of the first and second output shafts.

4. The variable speed, alternating current motor unit in claim 3 wherein the induction motors are rolled shell induction motors.

5. The variable speed, alternating current motor unit in claim 2, the improvement further comprising:

a locked-up differential including (a) a mechanical means for selectively interconnecting the first and second output shafts, the mechanical means having a first position in which the first and second output shafts are disengaged for independent rotation and a second position in which the first and second output shafts are engaged for synchronous rotation, and (b) actuating means for selectively moving the mechanical means between the first and second positions.

6. The variable speed, alternating current motor unit in claim 2, the improvement further comprising:

a no-fade brake system including (a) a spider mounted at each of the opposite ends of the housing, (b) a brake coil attached to each spider, (c) a brake drum mounted on each of the first and second output shafts, and (d) means for simultaneously energizing the brake coils.

7. In a variable speed, alternating current motor unit including two induction motors rotatably mounted in a housing so that the stator elements of the induction motors buck one another to induce torque in the rotor elements of the induction motors when both of the induction motors are energized and further including a speed control circuit for energizing the induction motors, the improvement in the speed control circuit comprising:

first means for connecting a first induction motor directly to an alternating current source, and second means for selectively connecting the second induction motor to the alternating current source including (a) a triac switch circuit having a first state in which the second induction motor is disconnected from the alternating current source and a second state in which the second induction motor is connected to the alternating current source, (b) a trigger circuit connected to the triac switch circuit for triggering the triac switch circuit from the first state to the second state whenever a gating voltage is present, (c) a motor speed transducer for generating a voltage proportional to speed, (d) a manually adjustable speed selector for producing a voltage representative of a desired speed, and (e) a voltage comparison circuit connected to the motor speed transducer and the speed selector for producing the gating voltage whenever the speed selector voltage exceeds the motor speed transducer voltage.

8. The variable speed, alternating current motor unit in claim 7 wherein the speed selector is a potentiometer with a wiper mechanically returned to a zero position in which the speed selector voltage is zero and manually movable to a different position in which the speed selector voltage is non-zero.

9. The variable speed, alternating current motor unit in claim 8 wherein the wiper is adapted to be moved by the foot of an operator.

10. The variable speed, alternating current motor unit in claim 6 wherein the speed control circuit includes a speed selector comprising a potentiometer with a wiper mechanically returned to a zero position in which the desired speed is zero and manually movable to a different position in which the desired speed is non-zero, and wherein the coil energizing means energizes each brake coil when the wiper is in the zero position and de-energizes each brake coil when the wiper is in the non-zero position.

11. The variable speed, alternating current motor unit in claim 10 further including a manually actuable hydraulic brake means having a first condition in which the coil energizing means energizes each brake coil with a first predetermined voltage when the wiper is in the zero position and having a second condition in which the coil energizing means energizes each brake coil with a second higher predetermined voltage when the wiper is in the zero position.

12. The variable speed, alternating current motor unit in claim 7 wherein the speed control circuit further comprises:

resistance means connected in shunt across the triac switch circuit for enabling the alternating current source to excite the second induction motor when the triac switch circuit is in the first state, the triac switch circuit for effectively short-circuiting the resistance means when the triac switch circuit is in the second state.

13. A method for controlling the speed of a variable speed, alternating current motor unit with two induction motors rotatably mounted in a housing so that the stator elements of the induction motors buck one another to impart torque to the rotor elements of the induction motors when both of the induction motors are energized, including the steps of:

connecting one induction motor directly to an alternating current source, selecting a desired speed, producing a first voltage representative of a desired speed, generating a second voltage proportional to actual speed, comparing the first and second voltages to produce a gating voltage whenever the first voltage exceeds the second voltage, triggering a triac switch circuit from a first state in which the second induction motor is disconnected from the alternating current source to a second state in which the second induction motor is connected to the alternating current source whenever the gating voltage is present.

14. The method for controlling the speed of a variable speed, alternating current motor unit in claim 13, further including the steps of:

connecting resistance in shunt across the triac switch circuit, enabling the alternating current source to excite the second induction motor when the triac switch circuit is in the first state, effectively short-circuiting the resistance when the triac switch circuit is in the second state.

* * * * *